Sept. 15, 1953
C. L. MORRIS
2,652,279
RAKE
Filed Aug. 20, 1948
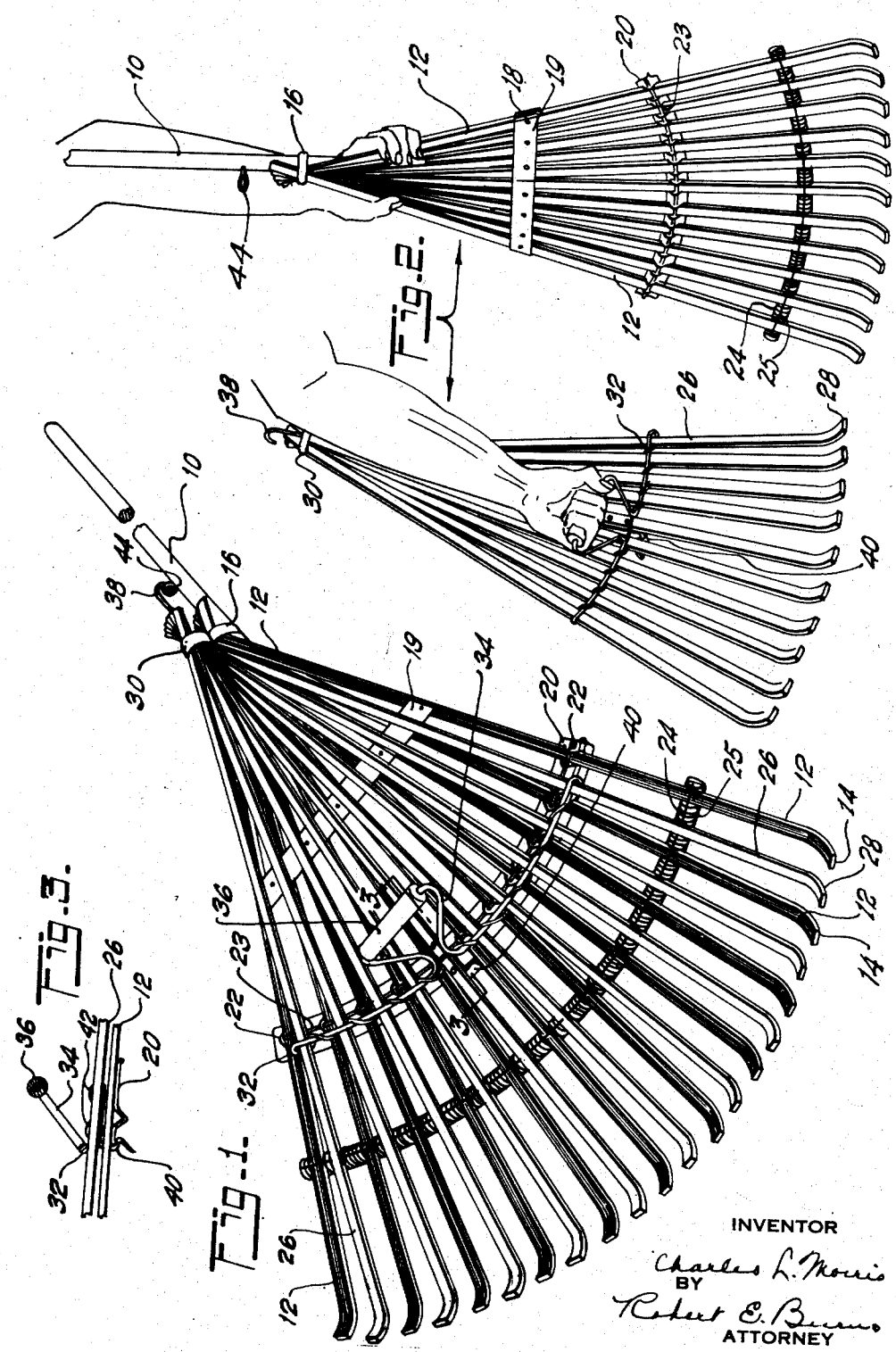
INVENTOR
Charles L. Morris
BY
Robert E. Burns
ATTORNEY Patented Sept. 15, 1953

2,652,279

UNITED STATES PATENT OFFICE 2,652,279

RAKE

Charles L. Morris, Greenwich, Conn.

Application August 20, 1948, Serial No. 45,273

3 Claims. (Cl. 294—50.9)

This invention relates to rakes and particularly to the type of rake known as a leaf, grass or lawn rake, having a raking head formed of relatively flexible bamboo or wooden tines.

Various types of grass rakes are known which are for use in the accumulation of grass, leaves and the like into piles. The type of rake to which this invention relates, which is composed of flexible tines, is particularly useful for raking grass and leaves from lawns and flower beds because the light, flexible tines do not dig into and injure the surface being raked as frequently occurs with the use of the conventional heavy iron rake which has rigid tines or rigid wooden teeth. Once the leaves and grass have been raked into piles, however, the usual type of grass rake is ineffective for the necessary subsequent step of removing the amassed material and transferring it to a box, wheelbarrow or other receptacle in which it may be removed.

It is the principal object of this invention to provide a rake which may be used for raking leaves and grass and which is also adapted to be used to lift and transport the accumulated material.

It is a further object of the invention to provide an improved rake having increased strength and durability.

Other objects and advantages of the invention will be apparent from the description which follows and from the accompanying drawing in which, Fig. 1 is a view in perspective of an embodiment of the invention, Fig. 2 is a view in perspective showing the manner in which the rake depicted in Fig. 1 may be utilized to scoop up leaves and grass, and Fig. 3 is a view in section taken generally along the line 3—3 of Fig. 1 showing one type of catch which may be employed to hold together the two parts of the raking head.

In accordance with the invention, I provide a grass rake having a handle and a ground-engaging raking head consisting of two interacting and complementary groups of tines or teeth. It is a feature of the invention that one group of tines may be disengaged and used, in conjunction with the remaining portion of the rake, as a lifting and carrying device, as will be described more fully hereinafter.

Referring to the drawings, the numeral 10 designates an elongated handle to which is secured a series of outwardly diverging tines 12, which have curved leaf-catching outer ends 14. The inner or convergent ends of the tines 12 are secured to the handle 10 by means of a clamp 16 which encircles handle 10 and tines 12 and holds them tightly against one another. The lower end of handle 10 is secured, as by a rivet, to bracing strips 18 and 19 which extend across the tines and are riveted or otherwise fastened thereto. Thus, by the combined action of clamp 16 and bracing strips 18 and 19, the tines 12 are rigidly secured to handle 10.

The tines 12 are braced and maintained in fixed spaced relation by an arcuate brace 20 which has an inwardly extending curved projection 22 adjacent each of the outermost tines 12. A tie wire 23, secured at each end to brace 20, passes under the projections 22 and holds the tines 12 firmly against brace 20. Additional bracing is provided by a helical wire 24 which passes around each of the tines 12. The ends of helical wire 24 and of guide wire 25 are secured to the two outermost tines 12.

As previously mentioned, my rake has a raking head which consists of two complementary groups of tines, one group comprising the tines 12 which are rigidly affixed to handle 10. The members of the second group of tines are adapted to cooperate with the tines 12 to provide a sturdy, durable raking head. The tines comprising this second group are designated by the numeral 26 and are similar in form to tines 12, having curved outer ends 28. The inner convergent ends of tines 26 are securely held in overlapping relationship by a clamp 30. Tines 26 diverge outwardly in fan-like configuration and are separated from one another by a space substantially equal to that between the tines 12. This spacing is provided in order that, when the tines 26 are placed in operative relationship with the tines 12, the tines 26 will be positioned centrally between the tines 12. The tines 26 are maintained in the desired outwardly-diverging spaced relationship by a tie element 32, suitably formed of heavy gauge wire. Referring particularly to Fig. 1, tie element 32 is formed with a loop 34 which is adapted to be used as a hand-grip or handle. For comfort in handling, a grip 36 is provided on tie element 32. It will be obvious that the handle, as formed by loop 34, may be formed independently of tie element 32 and secured to the tines 26 in any suitable manner.

The tines 26 are adapted to be releasably secured to the portion of the rake formed by the handle 10 and the tines 12. In the embodiment illustrated, this is effected by a hook 38 held by clamp 30, and a catch 40 which is secured, as by rivets 42, to the outer surface of the centermost of the tines 26. Hook 38 is adapted to engage eye 44 fastened to handle 10, and catch 40 is positioned to make engagement with arcuate brace 20, as shown in Fig. 3. Thus, to secure tines 26 in operative relationship with tines 12, hook 38 is passed through eye 44, and catch 40 is pressed into engagement with arcuate brace 20, whereby the two groups of tines are held firmly against one another. Catch 40 is suitably of a width substantially equal to the spacing between the tines 12 at arcuate brace 20. This insures against lateral movement of the tines 26. It will be apparent that the means illustrated for releasably securing tines 26 to tines 12 are but one of many equivalent means for accomplishing the same result, and the invention is not limited thereto.

It will be observed that the tines 26, when engaged with the tines 12, form an evenly-spaced multi-tined raking head. By virtue of the fact that the raking head is formed of two groups of tines, each group being in a different plane, I have found my rake to be sturdier and more rugged than the conventional grass rake wherein all the tines are arranged in a single group lying in a single plane.

My rake has the further advantage of being adapted for use as a lifting and carrying device. After the rake has been used, for example, to accumulate a mass of leaves into a pile, the rake may be converted into a lifting implement simply by pulling on handle 34, thereby releasing catch 40, and then moving this group of tines upwardly to disengage hook 38 and eye 44. As shown in Fig. 2, the two groups of tines may then be used as large hand-like implements to gather up the accumulated mass.

I am aware that various changes and modifications may be made in the embodiment which I have illustrated and described without departing from the scope of the invention as defined in the appended claims, and it is intended, therefore, that the foregoing shall be interpreted as illustrative and not as limiting upon my invention.

I claim:

1. In a rake of the character described, an elongated handle, a pair of separate raking heads, each of said heads comprising a plurality of tines secured together at one end and diverging outwardly in fan-like configuration and a spacing member spaced from said end and holding the tines in spaced relationship, the outer ends of the tines being curved downwardly, means rigidly and permanently securing one of said heads to one end of the handle and quick release means removably securing the second head to the handle and the first head with the tines of one head lying in the spaces between the tines of the other to form a continuous series of raking teeth, the second head being quickly removable and reversible relative to the first mentioned head to cooperate with the first mentioned head for use as tongs in picking up an accumulated mass of leaves and other debris the tines of the two heads curving inwardly toward one another during such use as tongs.

2. In a rake of the character described, an elongated handle, a pair of separate raking heads, each of said heads comprising a plurality of tines secured together at one end and diverging outwardly in fan-like configuration and a spacing member spaced from said end and holding the tines in spaced relationship, the outer ends of the tines being curved downwardly, means rigidly and permanently securing one of said heads to one end of the handle, quick release means removably securing the second head to the handle and the first head with the tines of the second head lying in the spaces between the tines of the first head and with all of the teeth curved in the same direction to form a continuous series of raking teeth, and a handle on the second head, the second head being quickly releasable and reversible relative to the first head so that the tines of the two heads curve inwardly toward one another, the two heads thus separated and reversed serving as tongs for use in picking up an accumulated mass of leaves and other debris.

3. In a rake of the character described, an elongated handle, a pair of separate raking heads, each comprising a plurality of tines converging and secured together at their upper ends and diverging outwardly in fan-like configuration, and a spacing member extending cross-wise of the tines intermediate their length and holding the tines in spaced relationship, the outer ends of the tines being curved downwardly, means rigidly and permanently securing one of said heads to one end of the handle, quick release means removably securing the second head to the handle and the first head with the tines of the second head lying in the spaces between the tines of the first head and with all of the teeth curved in the same direction to provide a continuous series of raking teeth, said quick release means comprising means for holding the converging upper end of the second head and a catch for holding the spacing member of the second head, the second head being quickly releasable and reversible relative to the first head so that the tines of the two heads curve inwardly toward one another, the two heads thus separated and reversed serving as tongs for use in picking up an accumulated mass of leaves and other debris.

CHARLES L. MORRIS.

References Cited in the file of this patent

UNITED STATES PATENTS

| Number | Name | Date |
| --- | --- | --- |
| 1,499,086 | Tsuchiya | June 24, 1924 |
| 1,939,475 | Walsh | Dec. 12, 1933 |
| 2,072,992 | Patemkin | Mar. 9, 1937 |
| 2,180,544 | Nissen | Nov. 21, 1939 |
| 2,207,488 | Laemmlin | July 9, 1940 |
| 2,504,943 | Zifferer | Apr. 18, 1950 |
| 2,546,113 | Spang | Mar. 20, 1951 |